Feb. 8, 1966  W. C. ERDMAN  3,233,984
SUPPORT ASSEMBLY FOR MATERIALS PROCESSING AND METHOD
Filed March 11, 1963
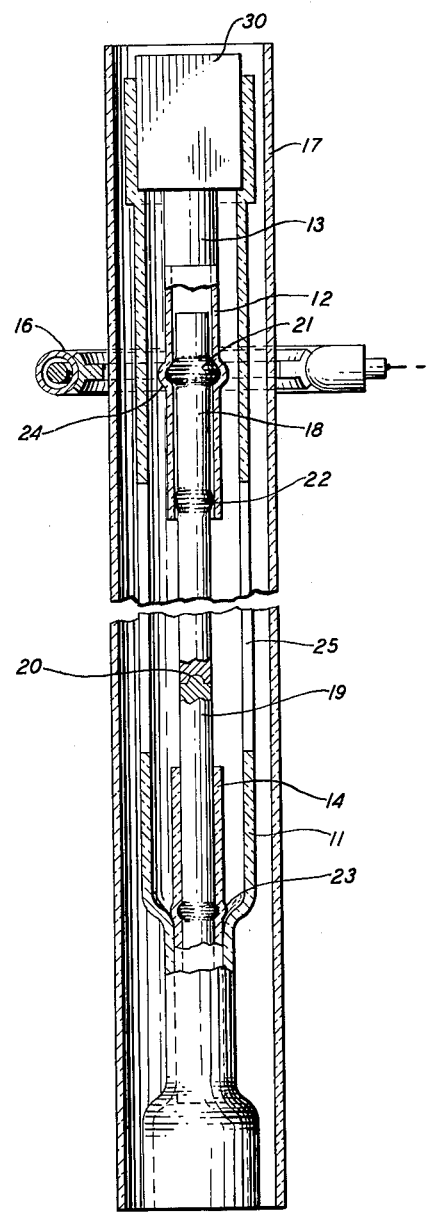
INVENTOR
W.C. ERDMAN
BY H.W. Lockhart
ATTORNEY 3,233,984
**SUPPORT ASSEMBLY FOR MATERIALS
PROCESSING AND METHOD**
William C. Erdman, Bethlehem, Pa., assignor to Bell
 Telephone Laboratories, Incorporated, New York,
 N.Y., a corporation of New York
Filed Mar. 11, 1963, Ser. No. 264,432
2 Claims. (Cl. 23—301)

This invention relates to an improved apparatus and method for preparing pure semiconductive material of the Group III–Group V intermetallic compounds. The invention relates in particular to the technique and apparatus for producing monocrystalline gallium arsenide by the floating zone method.

Apparatus and methods for purifying silicon by floating zone techniques are well known, as exemplified in Patent 2,901,325, issued August 25, 1959, to H. C. Theuerer. However, the processing of gallium arsenide and other Group III–Group V compounds in which at least one of the constituents is relatively volatile raises problems which are not applicable to the apparatus and methods that were previously employed. In particular, the relative volatility of certain constituents of Group III–Group V compounds, for example arsenic in gallium arsenide, requires the provision, during high temperature treatment, of a reactive gas ambient, including arsenic, to inhibit erosion of the compound by evaporation.

However, the apparatus and method used for floating zone purification of semiconductor material requires that the ingot to be purified and the single crystal seed portion be supported independently but in contact to enable formation and maintenance of the molten region, or floating zone, which is moved from the single crystal portion upward through the ingot being purified. In providing this support with the ingot and seed in contact for the initiation of molten zone refining, allowance must be made for differential thermal expansion caused by raising the entire apparatus to the temperature of the reactive gas ambient around the material. If the charge ingot and seed are mechanically supported in contact when assembled, differential thermal expansion will cause them to separate when the assembly is raised to the reactive gas ambient temperature.

Moreover, it is desirable that the material used in the apparatus be free of sources of contamination. Typically, metal members used for mechanical support are sources of such contamination, and an all-quartz system is highly desirable from this standpoint. Other high temperature materials that meet purity requirements may be found equally suitable.

Therefore, an object of this invention is to solve the problems of differential thermal expansion in floating zone purification of certain compound semiconductors.

Another object is a floating zone support apparatus using substantially contamination-free materials, in particular, an all-quartz housing and support assembly.

In accordance with this invention, the apparatus for floating zone purification of gallium arsenide enables assembly of the ingot or charge crystal in a substantially vertical position and resting upon the seed crystal. The entire assembly then is raised to the temperature required for the reactive gas ambient, approximately 600 degrees centigrade. Upon stabilizing the apparatus at this elevated temperature, a molten zone is produced in the uppermost portion of the charge crystal at a point where a bulbous section is provided in the upper tubular holder. This molten zone portion flows outward to fill the bulbous enclosure and, upon removal of heat, solidifies therein. This expanded solid portion provides a latching means for supporting the ingot during subsequent molten zone purifying which is accomplished by moving a molten zone upwardly from the seed crystal-ingot interface.

Thus the apparatus of this invention avoids the use of metal members for supporting the semiconductor materials by the use of simple quartz tubing and other quartz parts while, at the same time, ensuring proper contact between the seed crystal and the charge to be purified for the initiation of molten zone purification. At the conclusion of the processing, a small portion of the charge crystal near its upper end, containing the bulbous section, is discarded.

The invention and its other objects and features will be more clearly understood from the following detailed explanation taken in connection with the drawing showing a front elevation partly in section of an apparatus found particularly effective for the purification of gallium arsenide.

The drawing illustrates a portion of floating zone apparatus, particularly that involved in the practice of this invention. The gallium arsenide material to be purified is in the form of a charge ingot 18 approximately six inches in length and six to eight millimeters in diameter. The ingot 18 is supported within the upper quartz holder 13 and rests upon the single crystal gallium arsenide seed 19 at the joint 20. As shown, the upper holder has a solid portion, including a section 30 of large diameter, and a tubular portion 12 including a bulb section 24.

The seed crystal 19, in turn, is supported within the lower quartz holder 14. The gallium arsenide material and holders, in turn, are supported from and enclosed by a tubular quartz jacket 11. The lower holder 14 has an enlarged portion 23 resting on the necked portion of the jacket 11 and the upper holder 13 similarly is supported from enlarged portion 30. The slots 25 in this jacket are provided to improve visibility within the jacket. Another tubular quartz enclosure 17 surrounds the jacket and provides the container for the reactive gas ambient which is necessary during the processing of the gallium arsenide. Surrounding the outer chamber 17 is a coil 16 of a well-known configuration for inductively heating the gallium arsenide material.

Although not shown, means are provided for moving the assembly relative to the induction heating coil 16. One general arrangement for accomplishing this is shown in the above-identified patent to Theuerer.

The practice of the invention and its particular advantages will be understood from the following description of the assembly operation preliminary to the floating zone processing. The charge ingot 18, the gallium arsenide polycrystal to be purified, is prepared in a glass container in which it is etched, rinsed and dried. The ingot 18 then is mounted in the tubular portion 12 of the upper holder 13 by sliding it out of the glass container without hand contact. The seed crystal 19 similarly is mounted in the lower tubular holder 14, and the holders and gallium arsenide crystals are fitted into the quartz jacket 11. A ball and socket surface 20 ground on the ends of the seed 19 and ingot 18 ensures stability against the effects of vibration during the subsequent evacuation of the quartz envelope. The jacketed assembly then is placed within the outer enclosure 17.

At this stage the ingot crystal 18 is supported within the assembly only by the relatively loose fit within the upper tubular portion 12 and by resting upon the seed crystal. Any attempt to form a molten zone in the ingot crystal 18 under this condition would fail because of the unsupported weight of the ingot portion above the molten zone. According to the prior art, the ingot crystal 18 is supported by mechanically securing it to the upper holder 13 during the assembly operation using keys or pins. However, the assembly next is placed in a heated furnace and raised to a temperature of 610 degrees centigrade for the provision of the reactive gas ambient. Consequently, with such prior methods, the differential thermal expansion of the several parts of the assembly caused the ingot crystal 18 to separate from the seed crystal 19 at the joint 20. Initial formation of the refining molten zone under such circumstances is a matter of great difficulty.

In accordance with this invention, however, the assembly is evacuated and heated to 610 degrees centigrade, as required for maintenance of the arsenic pressure, and the induction heating coil 16 is energized at the location shown in the drawing surrounding the bulb section 24 in the tubular portion 12. A molten zone 21 is formed thereby which flows sufficiently to substantially fill the bulb section 24 of the holder. This zone 21 then is slowly frozen and thus provides a means of latching the ingot crystal in the vertical position. Additional stability against lateral rocking may be provided by producing a small expanded zone 22 to act as an additional journal against the inner surface of the holder. This may be done in similar fashion using the coil 16.

The ingot crystal 18 then is purified by conventional floating zone techniques by disposing the induction heating coil 16 about the interface or joint 20 between the ingot 18 and the seed crystal 19. In accordance with methods known in the art, the molten zone, supported by surface tension forces, then is moved upwardly from this interface to produce a purified single crystal of gallium arsenide material. During this processing, the ingot crystal 18 is secured against settling as a consequence of its upper portion being latched within the bulb section 24 of the upper holder 12. At the conclusion of the refining process, the apparatus is disassembled and the purified crystal is cut off at the point where the ingot enters the upper quartz holder. The portion of the ingot within the upper holder may be retrieved by etching to release it from the holder after which it may be reconstructed to be used as a part of another ingot crystal. This portion is not usable for device fabrication, however, it forms only a small percentage of the total material processed and tends, by the nature of the process, to contain a high concentration of impurities.

The above-described apparatus employs only quartz parts and eliminates the necessity for the use of metal members, such as molybdenum, which are difficult to completely clean and thereby may provide sources of contamination. Furthermore, the arrangment in accordance with this invention eliminates the need for cutting precision or complex surfaces in the gallium arsenide ingot in order to key or pin it to the upper holder or support. Such machining operations are both time consuming and subject to material losses by reason of cracking of crystals. The above-described apparatus and technique is particularly advantageous for any processing of this general type in which it is necessary to provide a gas ambient at an elevated temperature, and it presents a convenient and easily used system for avoiding the problems of differential thermal expansion as well as enhancing the overall cleanliness of the fabrication. It may find use for such process of other intermetallic compounds having at least one relatively volatile constituent including gallium phosphide, indium arsenide, and indium phosphide.

Although the invention has been described in terms of a specific embodiment, it will be understood that other arrangements and modifications may be made by those skilled in the art which still may lie within the scope and spirit of the invention.

What is claimed is:

1. In the method of refining crystalline gallium arsenide semiconductor material which includes passing a molten zone along a vertically disposed polycrystal rod thereof, the steps of positioning the rod upon a gallium arsenide seed crystal and within an upper tube member, said tube member having a bulb section near the upper end thereof, then providing a high temperature reactive gas ambient around said tube member, then melting a zone in the rod in the vicinity of said bulb section to cause a flow of the molten zone into said bulb section to substantially fill said section, and then solidifying said zone to latch said rod within said holder.

2. The method of refining crystalline gallium arsenide semiconductor material which includes passing a molten zone along a vertically disposed polycrystal rod thereof, the steps of mounting a gallium arsenide single crystal seed in a lower holder member, then mounting said gallium arsenide rod with its bottom end surface resting on the top end of said seed crystal and with its upper portion within a tubular upper holder, said upper holder having a bulb section therein, then placing said holders within a hermetic enclosure, then evacuating said enclosure, then providing a high temperature reactive gas ambient within said enclosure, then melting a zone in the rod in the vicinity of said bulb section to cause a flow of the molten zone into said bulb section to substantially fill said section, then solidifying said zone to latch said rod within said holder, and then passing a molten zone from said single crystal through said polycrystal rod.

References Cited by the Examiner

UNITED STATES PATENTS 2,584,696  2/1952  Graham _____ 29—522

OTHER REFERENCES

Cunnell et al.: Technology of Gallium Arsenide, Solid-State Electronics, May 1960, vol. 1, pages 97–106.

NORMAN YUDKOFF, *Primary Examiner.*